United States Patent
Mildh et al.

(10) Patent No.: US 8,462,752 B2
(45) Date of Patent: Jun. 11, 2013

(54) METHOD AND ARRANGEMENT FOR PROCESSING MOBILE STATION HISTORY INFORMATION IN A WIRELESS COMMUNICATION SYSTEM

(75) Inventors: Gunnar Mildh, Sollentuna (SE); Mattias Wahlqvist, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 13/487,992

(22) Filed: Jun. 4, 2012

(65) Prior Publication Data

US 2012/0238261 A1 Sep. 20, 2012

Related U.S. Application Data

(63) Continuation of application No. 12/597,559, filed as application No. PCT/SE2007/051050 on Dec. 20, 2007.

(30) Foreign Application Priority Data

Apr. 26, 2007 (SE) ........................ 0701010

(51) Int. Cl.
*H04W 4/00* (2009.01)

(52) U.S. Cl.
USPC ........................................... 370/338

(58) Field of Classification Search
None
See application file for complete search history.

(56) References Cited

U.S. PATENT DOCUMENTS

| 5,189,734 | A | * | 2/1993 | Bailey et al. | ............ 455/438 |
| 2007/0072605 | A1 | * | 3/2007 | Poczo | ............ 455/432.2 |
| 2010/0142486 | A1 | | 6/2010 | Wahlqvist et al. | |

* cited by examiner

*Primary Examiner* — Raj Jain

(57) ABSTRACT

Methods and apparatus for processing mobile station transaction information at a serving control node in a wireless communication system are disclosed. The serving control node may be a base station, such as an eNodeB in an LTE/SAE wireless communication system. The transaction information, which may include, for example, mobility-related transaction information and traffic-related transaction information for a given mobile station, may be passed between controlling control nodes as the corresponding mobile station is handed over, so that a controlling control node has access to information characterizing the past activities of the mobile station. This information may be used in some embodiments for selecting a target control node for handover or for allocating link resources.

36 Claims, 5 Drawing Sheets

METHOD AND ARRANGEMENT FOR PROCESSING MOBILE STATION HISTORY INFORMATION IN A WIRELESS COMMUNICATION SYSTEM

CROSS-REFERENCE TO RELATED APPLICATIONS

This application is a continuation of U.S. application Ser. No. 12/597,559, filed Feb. 18, 2010, pending, which was the National Stage of International Application No. PCT/SE07/51050, filed Dec. 20, 2007, which claims the benefit of Swedish Application No. 0701010-1, filed Apr. 26, 2007, the disclosure of which is incorporated herein by reference.

BACKGROUND

1. Technical Field

The present invention generally relates to wireless communications, and particularly relates to methods and apparatus for processing mobile station transaction information among base stations in a wireless communication system employing a distributed control architecture.

2. Background

As wireless network operators strive to increase the capacity and throughput of their networks, it is expected that cells in mobile communication systems will be deployed in a wide variety of sizes. In particular, many cells will be much smaller than in past systems. Network operators are already beginning to extensively deploy so-called micro-cells and pico-cells in, for example, shopping centers, city centers, and office areas.

At the same time, there is a trend to move radio network control functionality to the base station site in new network architectures. This is true, for example, in the Long Term Evolution (LTE) wireless communication systems currently under development by the $3^{rd}$-Generation Partnership Project (3GPP). Similar concepts are also being discussed with respect to the implementation of very small Radio Network Controllers (RNCs) for Evolved High-Speed Packet Access (HSPA) systems. Proponents of this trend suggest that locating resource control functionality at the base station site will result in better system performance, because more timely information will be available for radio resource management decisions.

On the other hand, network control procedures implemented in a centralized architecture, such as handover procedures in a conventional 3G RNC, can more readily exploit information regarding the situation in several neighboring cells as well as conditions in the current cell where a user equipment (UE) is located. The use of a distributed architecture, i.e., a system model where control functionality is pushed to the base stations, thus potentially creates a situation where the control function has a great deal of up-to-date knowledge of the local environment, but does not have the broader network overview that might be available in a centralized control function. In such a system, a handover procedure performed at an LTE base station (an eNodeB) might be based largely on limited information, such as status information for the current cell and any neighboring cells served by the same eNodeB.

Another potential problem with a distributed architecture model is that mobile user equipment may be controlled by several different controllers over a short period of time, as the user equipment is passed (handed over) from one base station to another. Although each controller (the eNodeB in the case of an LTE system) can monitor the activity of a specific mobile station while serving that mobile station, this information is generally lost when the mobile station is handed over to another controller. This is less of a problem in a system using a centralized control architecture, since a controller in such a system typically covers many cells, and a mobile station is generally controlled by the same controller for a longer period of time.

SUMMARY

The present invention comprises methods and apparatus for processing mobile station transaction information at a serving control node in a wireless communication system. In particular, the serving control node may be a base station node, such as an eNodeB in an LTE/SAE system. The transaction information which may include, for example, mobility-related transaction information and traffic-related transaction information for a given mobile station, may be updated and passed between controlling control nodes as the corresponding mobile station is handed over, so that a controlling control node has access to information characterizing the past activities of the mobile station. The transaction information, which may be passed from one control node to another in the form of a transaction history record, may include, by way of non-limiting example, information about the cells in which the mobile station has been present, and for how long, as well as information describing the mobile station's uplink and downlink data transfer activity.

Among the advantages provided by the inventive methods and apparatus disclosed herein are that a control node in accordance with one or more embodiments of the invention thus has access to historical transaction information for a served mobile station, which may be used, in various embodiments, to improve link resource allocation decisions, to improve handover decisions, and to detect and/or prevent undesirable handover patterns, including so-called ping-pong handovers. Those skilled in the art will appreciate further advantages resulting from the timely, comprehensive, and up-to-date historical information made available by several embodiments of the present invention.

Accordingly, an exemplary method comprises receiving, at a serving control node, a transaction history record from a transferring control node in association with a first handover of a mobile station to the serving control node. After adding mobile station transaction data related to the serving control node to the transaction history record to obtain an updated transaction history record, the updated transaction history record is transferred to a target control node in association with a subsequent handover of the mobile station to the target control node. In some embodiments, the method further comprises using the transaction history record to make handover decisions, such as selecting a target control node for a handover, or for allocating link resources.

Embodiments of the invention further include a control node configured to carry out one or more of the methods described for processing mobile station transaction history data. One or more of these control node embodiments may comprise an eNodeB for use in an LTE/SAE network.

In still other embodiments, a computer program product includes computer-readable program code embodied on a computer-readable medium, the computer readable program code being configured to carry out one or more of the above-described methods.

Of course, the present invention is not limited to the above features and advantages. Indeed, those skilled in the art will

DETAILED DESCRIPTION

Figure 1:
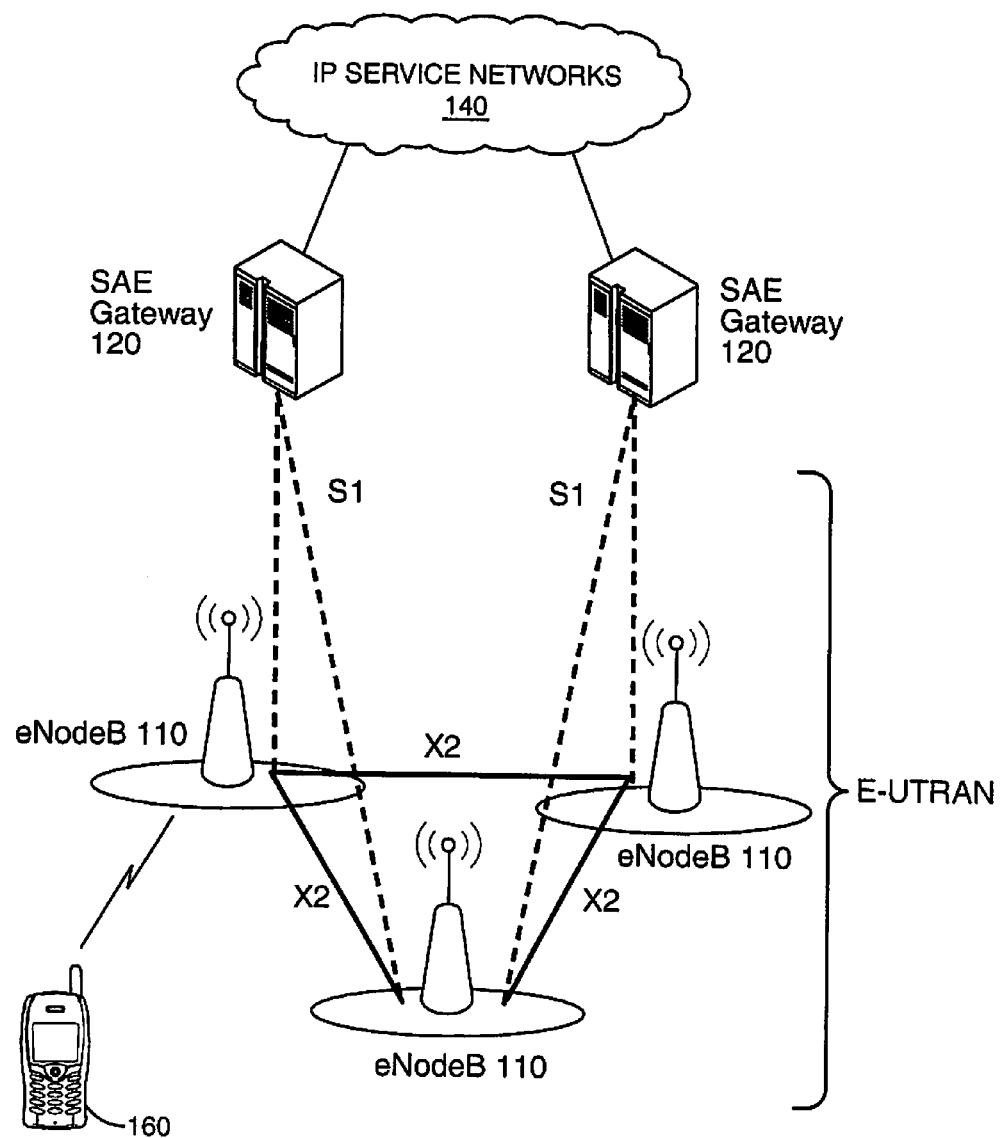
FIG. 1 is a diagram illustrating aspects of an LTE/SAE wireless communication network.

The design and specification of the next generation of wireless communication networks is currently ongoing under the auspices of the 3$^{rd}$-Generation Partnership Project (3GPP), in an effort known as the Long Term Evolution (LTE) initiative. Along with the definition of new wireless interfaces, a new core network architecture is also being defined, in a standardization effort referred to as System Architecture Evolution (SAE). As shown in FIG. 1, an LTE/SAE network includes at least two types of network elements supporting user and control planes: an enhanced base station 110, called the Evolved NodeB or "eNodeB"; and the SAE Gateway 120. The eNodeB 110 provides the LTE air interface and radio resource management, while the SAE Gateway 120 provides a mobility anchor point for the user plane and provides a gateway to IP service networks 140, which may include the Internet, intranets, and other IP-based service networks.

In the discussion that follows, the present inventive methods and apparatus are described in the context of an LTE/SAE wireless network. In this case, many of the control functions described herein reside in an eNodeB 110. However, those skilled in the art will appreciate that the inventive techniques described herein are applicable to other network types and other network configurations. For example, the inventive methods and apparatus disclosed herein may be applicable to an evolved High-Speed Packet Access (HSPA) architecture, in which the Radio Network Controller (RNC) is integrated into the NodeB, as well as to a Release 99 GERAN/UTRAN architecture, in which the history information described below might be transferred between peer control nodes (e.g., RNCs and/or Base Station Controllers). Thus, the description of the invention in terms of LTE/SAE network elements is meant to be illustrative, not limiting.

Unlike its predecessors, the LTE/SAE architecture does not include a separate Radio Network Controller (RNC) responsible for managing several base stations. Instead, many of the radio resource management and mobility management functions previously performed by a RNC are moved to the eNodeB 110. As noted above, this move allows the control function to access more timely information regarding the radio resource conditions (e.g., signal conditions, loading conditions) at the one or several cells served by the eNodeB 110. However, this move also presents some challenges, as an eNodeB 110 generally lacks the broader system overview that an RNC monitoring several base stations might have.

Control decisions made with only local information can create several problems. For instance, a rapidly moving mobile station (such as mobile station 160 in FIG. 1) in a distributed architecture might be handed over between several micro-cells (generating frequent handovers), when this mobile station 160 might be better served by a macro-cell in the same area. A control function located at one of these several micro-cells may be unaware that that the mobile station 160 is moving rapidly, or that the mobile station 160 has recently encountered frequent handovers.

As another example, an inactive mobile station 160 should after some period of time be moved into a more power-efficient state. In a distributed architecture, there is a risk that a mobile station 160 moving across the network is never controlled by a single controller for a sufficiently long period of time for the controller to recognize that the more power-efficient state should be triggered.

Other problems may arise upon handover in system with distributed radio resource management. For instance, if a mobile station 160 is handed over from one base station to another in the middle of an ongoing uplink data transfer, it would be preferred that the mobile station 160 immediately receive an adequate allocation of uplink resources in the target cell, even before the mobile station 160 sends an uplink buffer status report to the target eNodeB 110. This is difficult to achieve in a distributed architecture if the resource control function at the target cell is unaware of the level of mobile station activity in the old cell. These challenges potentially result in wasted radio resources or unnecessarily constrained mobile station performance.

Thus, the present disclosure is directed to methods and apparatus for use in a wireless communication system, in which a controller unit, e.g., a radio resource control function in an LTE eNodeB 110, maintains a transaction history for a mobile station 160 and passes that history to subsequent controller units that receive control of the mobile station 160. The transaction history contains information about the past activities of the user equipment. In some embodiments, the transaction history includes mobility-related transaction information, such as information about the cells in which the mobile station 160 has been present and the time spent in those cells. In some embodiments, the transaction history includes traffic-related information, such as the quantity and/or type of data traffic sent to and/or received by the mobile station 160.

In an exemplary embodiment of the present invention, a resource controller currently serving a mobile station 160, e.g., the radio control function at the serving eNodeB 110, passes transaction history information for the mobile station 160 to the resource controller that will take over control of the mobile station 160 after handover, e.g. the radio control function at the target eNodeB 110. In various embodiments, this transaction history information may take any of several forms. For instance, the transaction history may comprise a historical list that lists events added by each controller that has controlled the mobile station 160. Alternatively (or in addition to said list), the transaction history may comprise one or several cumulative parameters describing the past mobility and activity level of the mobile station 160. These cumulative parameters may be updated by each control function as the mobile station 160 is handed over from one base station to another.

In some embodiments, the controller, when taking control of a mobile station 160 by means of an incoming handover, receives a transaction history record from the previous control function, and uses the transaction history information as input to subsequent decision processes. For instance, the controller may use traffic-related transaction information from the transaction history record in allocating resources to the mobile station 160. This traffic-related transaction information might include data rates, data quantities, and/or data types recently transmitted or received by the mobile station 160. The controller might also use mobility-related transaction information from the transaction history record, including information identifying previous cells and previous cell types visited by the mobile station 160 and the time spent at each. A controller might use this type of information, for example, in selecting a target cell for a subsequent handover. For instance, if the historical mobility-related transaction information indicates that the mobile station 160 has been frequently handed over, the controller might determine that a macro-cell is a more appropriate handover target than an adjacent micro-cell.

In several embodiments, a serving controller might add additional transaction information, and/or update cumulative parameters concerning the mobile station's activity, for passing on to a subsequent controller when performing a subsequent handover.

The transaction history record might be defined with a parameter indicating a maximum size for the record, to control the size of the record that is forwarded at each handover. In some such embodiments, controllers might apply a first-in-first-out strategy when the size of the transaction history record exceeds the predetermined maximum size, deleting the oldest information to make room for newer information. In other embodiments, information might be stored in the record in association with a time stamp, so that transaction information that exceeds a certain age, i.e., information that has been in the record for greater than a predetermined time, is removed from the transaction history.

Figure 2:
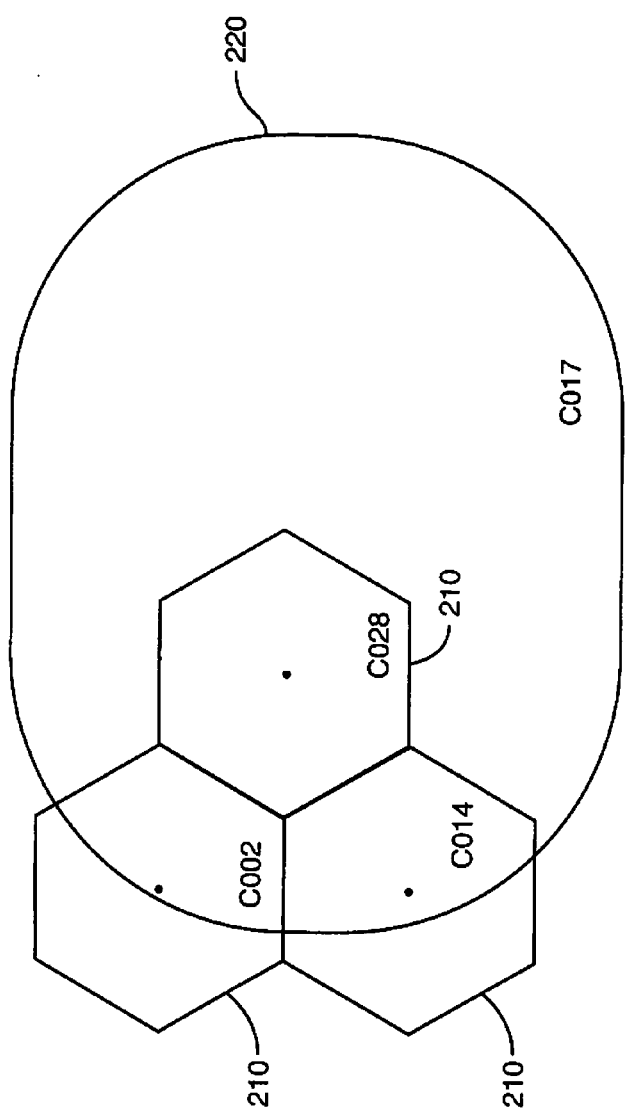
FIG. 2 illustrates exemplary mobile station transaction information and its relationship to cells of a wireless communication system.

Generally, but without excluding other types of information, the content of the transaction history may be divided into at least two categories. The first, mobility-related transaction information, comprises information related to previously-visited cells. This category of information might include, among other things, a cell identity, cell type, and time spent in a cell (or a mobile terminal entry time and/or mobile terminal departure time), for each of several previously visited cells. FIG. 2 illustrates an example of the mobility-related transaction information that might be contained in a transaction history record. In FIG. 2, cell IDs c002, c028, and c014 identify micro-cells 210 covering an area partly covered by a macro-cell 220, corresponding to a cell ID of C017. Exemplary mobility-related transaction information 230 is also pictured.

The receiving controller can use the historical information included in transaction information 230 together with other information, such as mobile station measurements, to take decisions regarding the most suitable target cell or system. For example, a radio resource controller using the mobility-related transaction information 230 of FIG. 1 might conclude that a mobile station 160 coming from cell c002 and having stayed there for less than a certain period of time, such as 120 seconds, should be handed over to the macro cell C017 if mobile station measurements indicate that this is feasible.

The receiving controller may also use this information to estimate other parameters. For example, if the controller has information on the average neighbor cell sizes, it might use transaction history information indicating the time spent in previous cells to produce a rough speed estimate for the mobile station 160. Referring once more to the mobility-related transaction information shown in FIG. 2, a mobile station 160 that stayed for 84 seconds in cell c028, perhaps having a radius of only 100 meters, might be designated as a "medium-speed" user.

Mobility-related transaction information might also be used to generate and update cumulative parameters that describe a mobile station's mobility. For instance, a running parameter indicating the number of handovers per time unit or an estimated mobile station velocity might be updated by each controller before the transaction history record is forwarded to a new controller. Optionally, these parameters might be weighted or filtered, so that recent mobility information is effectively ranked higher than older information.

A second category of transaction history data is traffic-related transaction information. This category might include information such as when the mobile station 160 entered an active mode and/or traffic activity (optionally, with time stamps) during the active mode. Traffic activity information might identify specific bearers that have been used by the mobile, the last time when a packet was sent, the quantity of data sent or received, the types of data sent or received, and so on. In some embodiments, data relating to various activities may be time-stamped with a time parameter calculated with reference to the starting time of an active mode. This approach can reduce the amount of data stored in the transaction record, and eliminates the need for time-stamps to be recalculated at each handover.

Referring again to FIG. 2, an exemplary set of traffic-related transaction information 240 is illustrated. Those skilled in the art will appreciate that the mobility-related and traffic-related data of FIG. 2 is illustrative only. As explained above, various data might be recorded at each base station. Furthermore, the information may be recorded in a variety of formats; appropriate coding of the information may reduce the size of the data that is transferred between base stations. In any event, in some embodiments of the present invention, a receiving controller can use the traffic-related transaction information 240, perhaps in conjunction with mobility-related transaction information 230, to make various resource management decisions. For instance, the controller might use the information to determine when to trigger a transition of the mobile station 160 to a more power-efficient state. As an example, the receiving controller might receive the traffic-related transaction information 240 in conjunction with a handover of a mobile station 160. After 1590 milliseconds from the moment that the mobile station 160 entered into the cell, the controller might trigger a transition to idle state. This example assumes an inactivity timer of 6000 milliseconds, which was triggered because the controller could calculate that the mobile station 160 had already been inactive for 4410 milliseconds (4560 minus 150).

As was described earlier with respect to mobility-related transaction information, a radio resource controller can generate and/or update one or more cumulative parameters describing a mobile station's traffic activity, for inclusion in the transaction history record passed from controller to controller. These cumulative parameters might include, for example, an average uplink and/or downlink bit rate, for a given time period or for the duration of an active mode period. Cumulative parameters indicating peak uplink or downlink requirements for the mobile station 160 might also be maintained. Any of these parameters might be weighted or filtered, so as to rank more recent activity information higher than older information.

Figure 3:
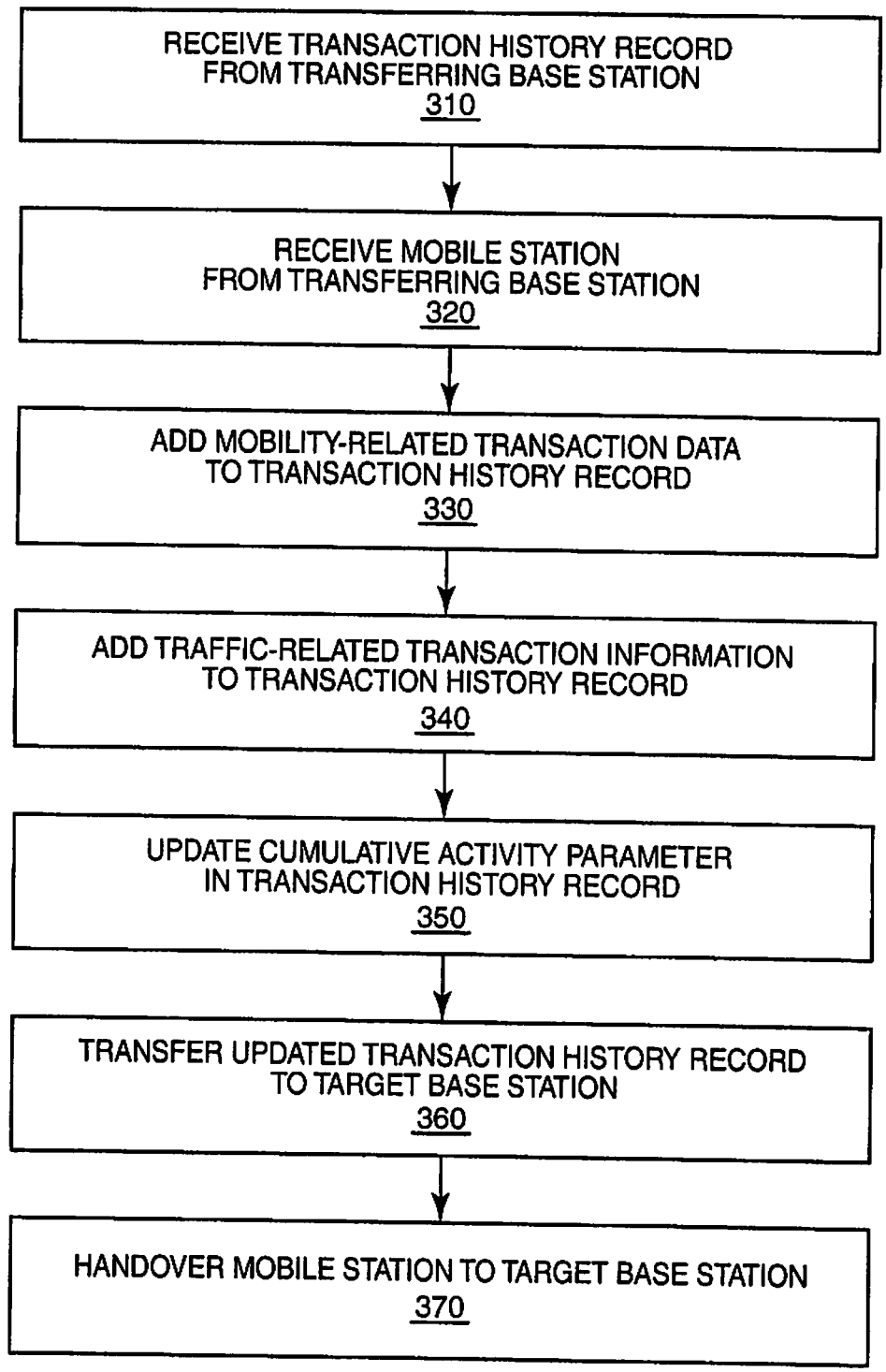
FIG. 3 is a logic flow diagram of one embodiment of a method for processing mobile station transaction information.

Accordingly, a transaction history record for a mobile station 160, containing any of the above information, may be passed from a transferring base station to a serving base station, in a first handover of the mobile station 160. After updating the transaction history record, the serving base station may transfer the updated transaction history record to a target base station in association with a subsequent handover of the mobile station 160. This general procedure is illustrated in FIG. 3, which may be implemented, for example, in an eNodeB 110 of an LTE/SAE wireless communication system. Those skilled in the art will appreciate that some of the steps illustrated in FIG. 3 may be omitted. Furthermore, several of the steps may be performed in a different order than shown.

At block 310, a transaction history record for a mobile station 160 is received from a transferring base station. In some embodiments, the transaction history is received in association with a handover of the mobile station 160 to a new serving base station. The transaction history record may be transferred directly, as part of the handover-related messaging between the transferring and new serving base station, or it may be transferred indirectly, such as through a separate gateway or server. In an LTE/SAE system, for example, the transaction history may be transferred between the base stations using the X2 interface defined by 3GPP.

At block 320, control of the mobile station 160 is received from the transferring mobile station 160. With the exception of the transfer of the transaction history record, handover may be performed according to conventional means. Those skilled in the art will appreciate that control of the mobile station 160 by the receiving base station may be obtained prior to receiving the transaction history record in some embodiments and/or under certain circumstances.

At block 330, the receiving base station (now the serving base station) adds mobility-related transaction data to the transaction history record. This may comprise simply adding a cell identifier corresponding to the serving base station, perhaps with a time stamp indicating the time spent at the receiving base station. This latter information, of course, cannot be finally added to the transaction history record until the mobile station 160 is handed over to a new base station. Other mobility-related transaction data, such as any of the items discussed above, may be added to the transaction history record as well.

At block 340, the serving base station adds traffic-related transaction data to the transaction history record. This may comprise any information characterizing data transfers performed while the mobile station 160 is served at the current cell, such as any of the data-related parameters discussed above. In some embodiments, as discussed earlier, parameters describing particular data transfer events may be added; these parameters may characterize a quantity or type of data transfer, and may include time stamp information. In some embodiments, the traffic-related transaction information added to the transaction history record may include only a time-stamp indicating when a mobile station 160 last transmitted or received data; in other embodiments, the traffic-related transaction information will characterize data transfers in great detail.

At block 350, one or more cumulative activity parameters are updated. This updating may require that a cumulative parameter be retrieved from the transaction history record, modified, and then saved in a newly updated transaction history record. These cumulative activity parameters, as noted above, may include parameters characterizing the mobile station's mobility, such as a parameter indicating the total number of handovers for a mobile station 160, or the number of handovers per a particular reference time period, or parameters characterizing data traffic activities, such as a maximum downlink or uplink data transfer, or an average rate of data transfer per a reference time period.

Finally, at block 360, the updated transaction history record is transferred to a target base station. This may be in association with a handover of the mobile station 160 to the target base station, as illustrated at block 370.

As noted above, the transaction history record corresponding to a mobile station 160 may be used by a serving base station to make radio resource control decisions related to that mobile station 160. The serving base station might, for instance, allocate link resources (such as resource blocks, in an LTE/SAE system) for the mobile station 160 based at least in part on traffic-related transaction information contained in the transaction history record. Further, a serving base station might base handover decisions on the transaction history record.

Figure 4:
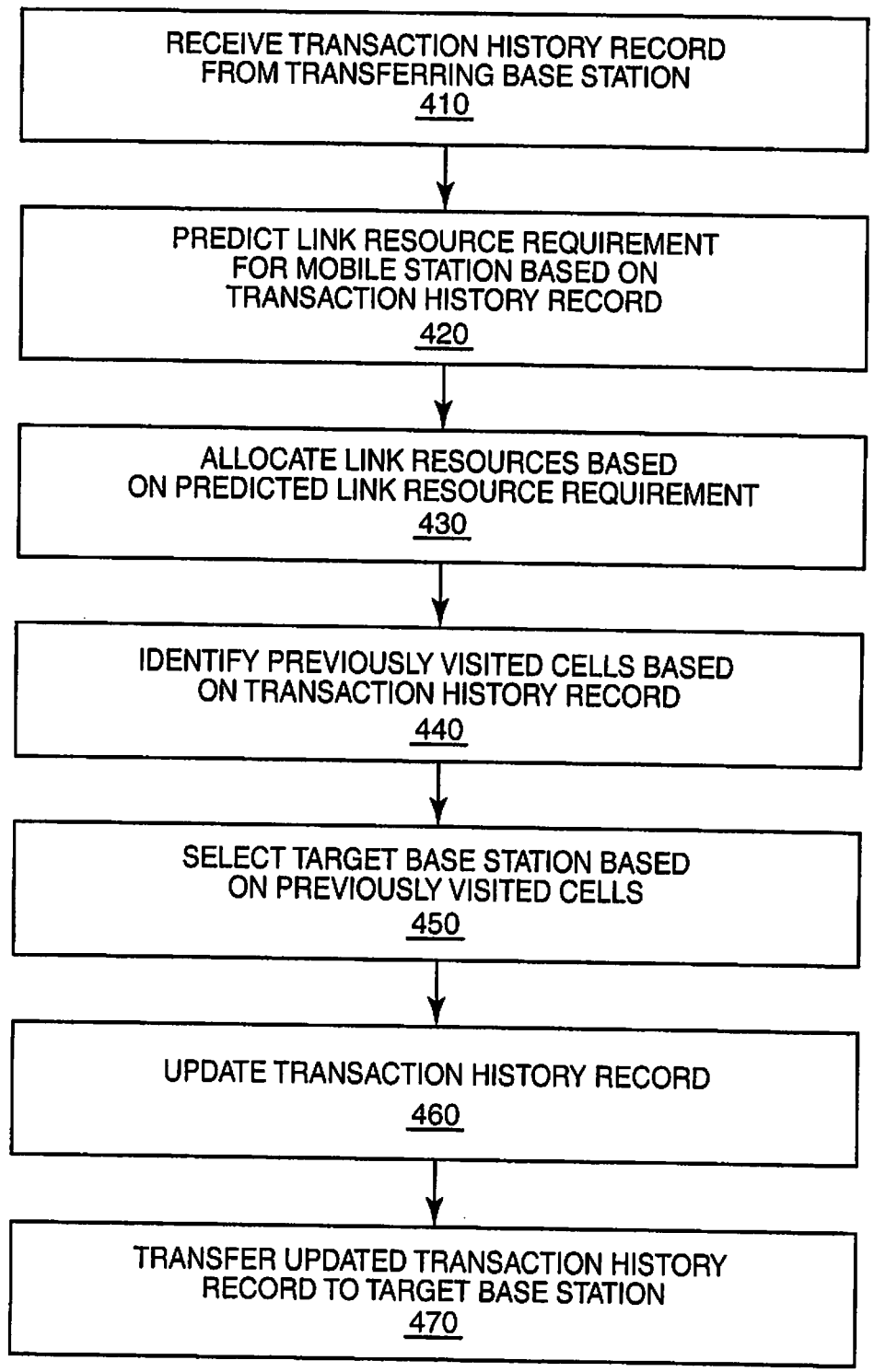
FIG. 4 is a logic flow diagram of another embodiment of a method for processing mobile station transaction information.

FIG. 4 thus provides an illustration of an exemplary method for using a transaction history record, as might be implemented, for example, in an eNodeB 110 of an LTE/SAE wireless communication system. The method of FIG. 4 "begins" at block 410 with the receipt of a transaction history record corresponding to a mobile station 160 under the control of (or about to be transferred to) a base station. Generally, the transaction history record is transferred directly from a transferring base station, although indirect transfers are possible. Those skilled in the art will appreciate that some of the steps illustrated in FIG. 4 may be omitted. Furthermore, several of the steps may be performed in a different order than shown.

At block 420, the receiving (now serving) base station predicts link resource requirements for the mobile station 160 based on the transaction history record. In some embodiments, the transaction history record may be available to the base station before a transmit buffer update is received from the newly transferred mobile station 160, and may be used to allocate link resources or update a previously made allocation of link resources, as shown at block 430. In some embodiments, the transaction history record may be used in conjunction with buffer information received from the mobile station 160 or determined at the base station to predict the resource requirements likely to be associated with the mobile station 160. Thus, some embodiments of the present invention provide the advantage of improved link resource allocation based on improved prediction of resource requirements for a served mobile station 160.

At block 440, the serving base station uses the transaction history record to identify cells previously visited by the mobile station 160. The transaction history record thus facilitates improved handover decisions, as this information may be used for, among other things, selecting a target base station, as shown at block 450. The previously-visited cell information may be used, for example, to reduce so-called ping-pong handovers, where a mobile station 160 is repeatedly handed over between two neighboring cells. Thus, in some embodiments, the previously-visited cell information is evaluated to detect a pattern of ping-pong handovers. If a pattern of ping-pong handovers, or other undesired handover pattern, is detected, then the serving base station may adjust one or more handover criteria in response. For instance, handover criteria may be adjusted so that a serving base station holds on to a mobile station for a longer time before handing over. (Those skilled in the art will appreciate that this may be accomplished in several ways. For instance, one or more signal strength thresholds for handover may be adjusted.) Alternatively, a mobile terminal may be handed over from a micro-cell to a macro-cell in response to detecting a ping-pong pattern or other undesired handover pattern. Detection of an undesired handover pattern may also trigger the generation of a diagnostic message for use by system operators in troubleshooting and maintaining the system. This diagnostic message may be saved in a log, or sent to a designated address for a system operator.

Similarly, the previously-visited cell information may be analyzed to determine whether a mobile station 160 currently served by a micro-cell might be better served by an overlapping macro-cell. This determination might be based, for instance, on the number of micro-cells visited in a given time period, so that rapidly moving mobile terminals experience fewer handovers.

At block 460, in preparation for an imminent handover, the transaction history record is updated, as discussed above in reference to FIG. 3. Finally, at block 470, the updated transaction history record is transferred to the target base station, again as discussed earlier.

Figure 5:
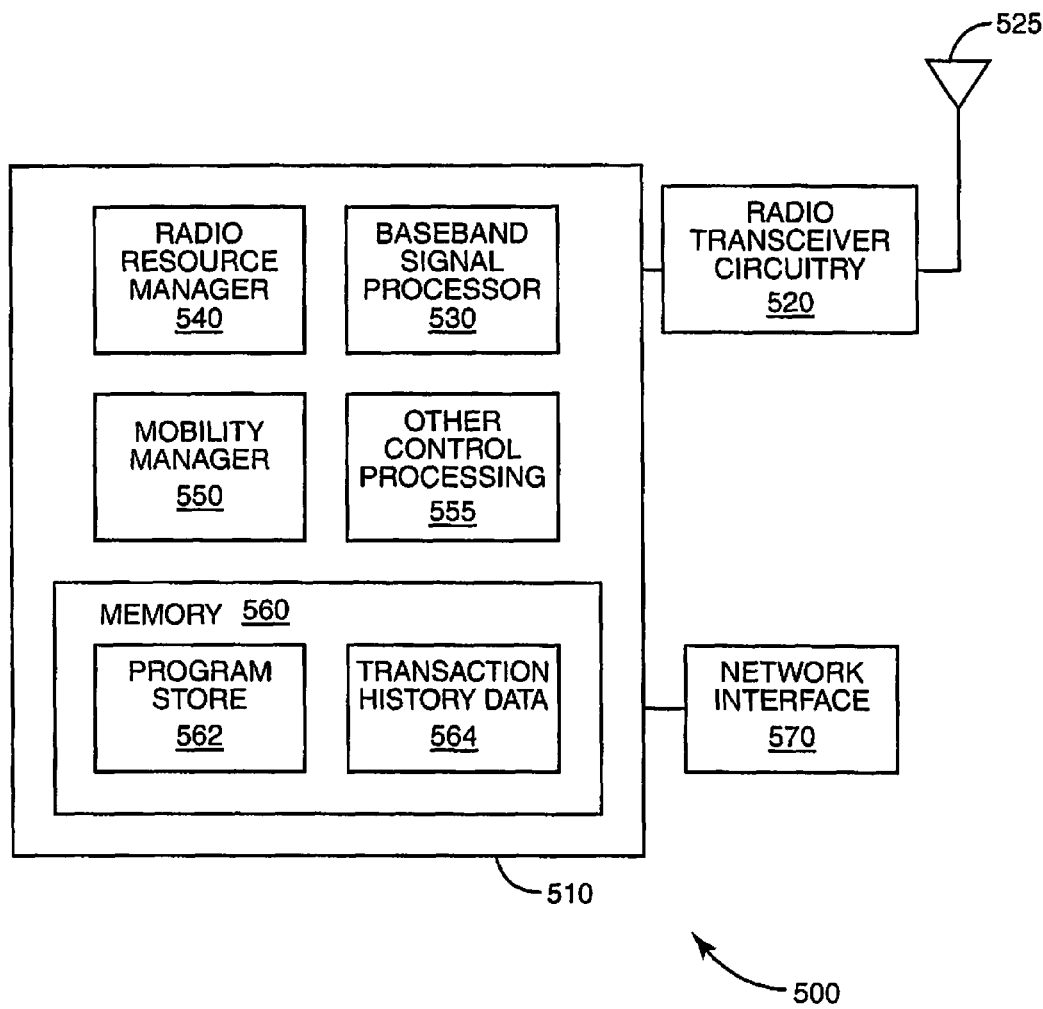
FIG. 5 is a block diagram of one embodiment of a base station configured to process mobile station transaction information.

Referring now to FIG. 5, an exemplary base station 500 that may be used to implement one or more of the methods described herein is pictured. Those skilled in the art will appreciate that the illustrated base station 500 is just one example of a control node for implementing the methods described herein. Many of the functions of control processor 510, in particular, may be implemented using a separate device, which might be co-located with conventional base station equipment or located remotely from the base station. Thus, the control node functionality may be part of an eNodeB in an LTE/SAE system, for example, or may be a separate control function in any other network. For instance, as discussed above, the control node functionality may be part of a radio network controller (RNC) or a base station controller. Thus, a control function may be associated with a single base station or several base stations.

In any event, the exemplary base station 500 of FIG. 1 includes a processing unit 510 configured for communication with one or more mobile stations 160 using radio transceiver circuitry 520 and antenna 525. Base station 500 further includes a network interface 570 for communication with other elements of a wireless network, including, in some embodiments, other base stations 500 and access gateways such as the LTE/SAE access gateways 120 pictured in FIG. 1. Those skilled in the art will appreciate that in some embodiments base station 500 may comprise an eNodeB for use in an LTE/SAE wireless communication system, but the inventive methods and apparatus described herein are applicable to other wireless network standards and other network configurations as well. Generally speaking, radio transceiver circuitry 520 and portions of the processing unit 510, such as baseband signal processor 530, are configured to comply with one or more wireless telecommunications standards, such as those promulgated by 3GPP. For instance, by way of non-limiting example, baseband signal processor 530 may be configured to encode and decode signals in accordance with 3GPP LTE standards defining physical layer protocols for Orthogonal Frequency Division Multiple Access (OFDMA)-based downlink signals and Single Carrier Frequency Division Multiple Access (SC-FDMA) uplink signals.

Processing unit 510 includes, in addition to baseband signal processor 530, a radio resource manager 540, mobility manager 550, other control processing 555, and memory 560, which in turn comprises a program store 562 and other data needed for operation of the base station 500, including transaction history data 564. Those skilled in the art will appreciate that FIG. 5 depicts a functional representation of the elements of processing unit 510. Accordingly, each of the pictured processing blocks may in some embodiments directly correspond to one or more commercially available or custom microprocessors, microcontrollers, or digital signal processors. In other embodiments, however, two or more of the functional blocks of 510 may be implemented on a single processor, while functions of other blocks are split between two or more processors. Likewise, memory 560 is representative of the one or more memory devices containing the software, firmware, and data used to implement base station functionality in accordance with one or more embodiments of the present invention. Thus, memory 560 may include, but is not limited to, the following types of devices: cache, ROM, PROM, EPROM, EEPROM, flash, SRAM, and DRAM.

Base station 500, and in particular, processing unit 510, may be configured to implement one or more of the methods described herein for processing mobile station transaction information. Accordingly, processing unit 510 may be configured to receive a transaction history record from a transferring base station in association with a first handover of a mobile station 160 to base station 500. The transaction history record is typically received through network interface 570, which in an LTE system may comprise an X2 interface as defined by 3GPP specifications. The processing unit 510 is further configured to add mobile station transaction data to the transaction history record; this mobile station transaction may include mobility-related transaction information and/or traffic-related transaction information as described earlier. Processing unit 510 is further configured to transfer the updated transaction history record to a target base station in association with a subsequent handover of the mobile station to a target base station.

In some embodiments, processing unit 510 may be configured to identify previously visited cells for a mobile station using the corresponding transaction history record, and to select a target base station for the subsequent handover based, at least partly, on the previously-visited cell information. In such embodiments, then, mobility manager 550, which is generally responsible for handover-related functions, uses the contents of the transaction history record for a given mobile station 160 to make handover-related decisions. In some embodiments, processing unit 510 may estimate a speed for the mobile station 160, based on information included in the transaction history record, and may use that estimated speed in handover decisions. Thus, mobility manager 550 may determine that a particular mobile station 160 is better served by a macro cell than by a micro-cell, based on the transaction history data.

Similarly, the radio resource manager 540, which allocates link resources between multiple mobile stations 160, may use transaction history data to make resource allocation decisions. The transaction history record for a newly received mobile station 160 may be used, for example, to make or adjust link resource allocations in advance of receiving a transmit buffer update from the mobile station 160. The transaction history record may also be used in conjunction with status information received from the mobile station 160 for making link resource allocations.

Computer program code for carrying out operations of the various control nodes discussed above with respect to FIGS. 1-5 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention was described above with reference to flowchart and/or block diagram illustrations of methods, devices, and/or computer program products in accordance with some embodiments of the invention. These flowchart and/or block diagrams thus illustrate exemplary operations for processing mobile station transaction information in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special-purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

As will be appreciated by those skilled in the art, the foregoing description and the accompanying drawings represent non-limiting examples of the methods and apparatus taught herein. As such, the present invention is not limited by the above description and accompanying drawings. Instead, the present invention is limited only by the following claims and their legal equivalents.

What is claimed is:

1. A method for processing mobile station transaction information at a serving control node in a wireless communication system, the method comprising:
   receiving a transaction history record from a transferring control node in association with a first handover of a mobile station to the serving control node;
   adding mobile station transaction data related to the serving control node to the transaction history record to obtain an updated transaction history record;
   transferring the updated transaction history record to a target control node in association with a subsequent handover of the mobile station to the target control node.

2. The method of claim 1, wherein the mobile station transaction data comprises mobility-related transaction information or traffic-related transaction information or both.

3. The method of claim 1, wherein the transaction history record comprises identifiers for one or more cells visited by the mobile station before arriving at the serving control node.

4. The method of claim 1, wherein adding mobile station transaction data related to the serving control node to the transaction history record to obtain an updated transaction history record comprises adding a cell identification parameter for the serving control node and one or more of a cell descriptor and one or more time parameters indicating a length of time for which the mobile station was served by the serving control node.

5. The method of claim 4, wherein the cell descriptor indicates a cell type or a cell size or both.

6. The method of claim 1, wherein adding mobile station transaction data related to the serving control node to the transaction history record to obtain an updated transaction history record comprises adding at least one traffic activity parameter.

7. The method of claim 6, wherein the at least one traffic activity parameter indicates one or more of a data bearer type, a data quantity, a data rate, and a data activity time.

8. The method of claim 1, wherein adding mobile station transaction data related to the serving control node to the transaction history record to obtain an updated transaction history record comprises updating one or more cumulative parameters included in the transaction history record.

9. The method of claim 1, wherein the method further comprises selectively removing one or more data items from the received transaction history record based on the age of the one or more data items.

10. The method of claim 1, wherein the method further comprises selectively removing one or more data items from the received transaction history record based on the size of the transaction history record and a predetermined maximum size for the transaction history record.

11. The method of claim 1, wherein the method further comprises identifying previously visited cells for the mobile station using the transaction history record and selecting the target control node for the subsequent handover based on the previously visited cells.

12. The method of claim 1, wherein the method further comprises:
   identifying previously visited cells for the mobile station using the transaction history record;
   evaluating the identified previously visited cells to detect one or more undesired handover patterns; and
   selecting the target control node for the subsequent handover based on said evaluation and the previously identified cells.

13. The method of claim 12, wherein the one or more undesired handover patterns include a ping-pang handover pattern characterized by repeated handovers between two base stations, wherein selecting the target control node for the subsequent handover based on said evaluation and the previously identified cells comprises adjusting one or more handover criteria in response to detecting said ping-pong handover pattern.

14. The method of claim 12, wherein the method further comprises generating a diagnostic message in response to detecting one or more of the undesired handover patterns.

15. The method of claim 1, wherein the method further comprises determining an estimated speed for the mobile station using the transaction history record and selecting the target control node for the subsequent handover based on the estimated speed.

16. The method of claim 1, wherein the method further comprises predicting a link resource requirement for the mobile station based on the transaction history record and allocating link resources based on the predicted link resource requirement.

17. A first control node for use in a wireless communication system, the first control node including a processing unit, wherein the processing unit is configured to:
- receive a transaction history record from a transferring control node in association with a first handover of a mobile station to the first control node;
- add mobile station transaction data related to the first control node to the transaction history record to obtain an updated transaction history record;
- transfer the updated transaction history record to a target control node in association with a subsequent handover of the mobile station.

18. The first control node of claim 17, wherein the mobile station transaction data comprises mobility-related transaction information or traffic-related transaction information or both.

19. The first control node of claim 17, wherein the transaction history record comprises list of cells visited by the mobile station before arriving at the first control node.

20. The first control node of claim 17, wherein the first control node comprises a base station node in the wireless communication system.

21. The first control node of claim 17, wherein the first control node comprises a radio network controller (RNC) in the wireless communication system.

22. The first control node of claim 17, wherein the first control node comprises a base station controller (BSC) in the wireless communication system.

23. The first control node of claim 17, wherein the processing unit is configured to add mobile station transaction data related to the first control node to the transaction history record to obtain an updated transaction history record by adding a cell identification parameter associated with the first control node and one or more of a cell descriptor and one or more time parameters indicating a length of time for which the mobile station was served by a cell corresponding to the cell identification parameter.

24. The first control node of claim 23, wherein the cell descriptor indicates a cell type or a cell size or both.

25. The first control node of claim 17, wherein the processing unit is configured to add mobile station transaction data related to the first control node to the transaction history record to obtain an updated transaction history record by adding at least one traffic activity parameter.

26. The first control node of claim 25, wherein the at least one traffic activity parameter indicates one or more of a data bearer type, a data quantity, a data rate, and a data activity time.

27. The first control node of claim 17, wherein the processing unit is configured to add mobile station transaction data related to the first control node to the transaction history record to obtain an updated transaction history record by updating one or more cumulative parameters included in the transaction history record.

28. The first control node of claim 17, wherein the processing unit is further configured to selectively remove one or more data items from the received transaction history record based on the age of the one or more data items.

29. The first control node of claim 17, wherein the processing unit is further configured to selectively remove one or more data items from the received transaction history record based on the size of the transaction history record and a predetermined maximum size for the transaction history record.

30. The first control node of claim 17, wherein the processing unit is further configured to identify previously visited cells for the mobile station using the transaction history record and to select the target control node for the subsequent handover based on the previously visited cells.

31. The first control node of claim 17, wherein the processing unit is further configured to determine an estimated speed for the mobile station using the transaction history record and to select the target control node for the subsequent handover based on the estimated speed.

32. The first control node of claim 17, wherein the processing unit is further configured to predict a link resource requirement for the mobile station based on the transaction history record and to allocate link resources based on the predicted link resource requirement.

33. The first control node of claim 17, wherein the processing unit is further configured to:
- identify previously visited cells for the mobile station using the transaction history record;
- evaluate the identified previously visited cells to detect one or more undesired handover patterns; and
- select the target control node for the subsequent handover based on said evaluation and the previously identified cells.

34. The first control node of claim 33, wherein the one or more undesired handover patterns include a ping-pang handover pattern characterized by repeated handovers between two base stations, wherein the processing unit is further configured to adjust one or more handover criteria in response to detecting said ping-pong handover pattern.

35. The first control node of claim 33, wherein the processing unit is further configured to generate a diagnostic message in response to detecting one or more of the undesired handover patterns.

36. A non-transitory computer program product for use in or with a control node in a wireless communication system, the non-transitory, computer program product comprising computer-readable instructions operable, when executed by a processor, to:
- receive a transaction history record from a transferring control node in association with a first handover of a mobile station to the serving control node;
- add mobile station transaction data related to the serving control node to the transaction history record to obtain an updated transaction history record; and
- transfer the updated transaction history record to a target control node in association with a subsequent handover of the mobile station to the target control node.

* * * * *

UNITED STATES PATENT AND TRADEMARK OFFICE
CERTIFICATE OF CORRECTION

PATENT NO. : 8,462,752 B2
APPLICATION NO. : 13/487992
DATED : June 11, 2013
INVENTOR(S) : Mildh et al.

It is certified that error appears in the above-identified patent and that said Letters Patent is hereby corrected as shown below:

In the Claims:

In Column 12, Line 48, in Claim 13, delete "ping-pang" and insert -- ping-pong --, therefor.

In Column 13, Line 18, in Claim 19, delete "list" and insert -- a list --, therefor.

In Column 14, Line 33, in Claim 34, delete "ping-pang" and insert -- ping-pong --, therefor.

In Column 14, Line 44, in Claim 36, delete "non-transitory," and insert -- non-transitory --, therefor.

Signed and Sealed this
Eighth Day of October, 2013

Teresa Stanek Rea
*Deputy Director of the United States Patent and Trademark Office*